US012629608B1

(12) United States Patent
Zhang

(10) Patent No.: US 12,629,608 B1
(45) Date of Patent: May 19, 2026

(54) MULTIFUNCTION TOY

(71) Applicant: Canrui Zhang, Shenzhen (CN)

(72) Inventor: Canrui Zhang, Shenzhen (CN)

(73) Assignee: Canrui Zhang, Shenzhen (CN)

( * ) Notice: Subject to any disclaimer, the term of this patent is extended or adjusted under 35 U.S.C. 154(b) by 0 days.

(21) Appl. No.: 18/955,875

(22) Filed: Nov. 21, 2024

(51) Int. Cl.
*A63H 33/22* (2006.01)
*A63H 5/00* (2006.01)
*F21V 33/00* (2006.01)

(52) U.S. Cl.
CPC ............... *A63H 33/22* (2013.01); *A63H 5/00* (2013.01); *F21V 33/008* (2013.01)

(58) Field of Classification Search
CPC .......... A63H 33/22; A63H 5/00; F21V 33/008
USPC .............................. 446/397–422; 84/95.1–96
See application file for complete search history.

(56) References Cited

U.S. PATENT DOCUMENTS 2,229,025 A * 1/1941 Keyes ..................... G01J 3/522 84/474
2,880,639 A * 4/1959 Gorr ......................... G10F 1/06 84/408
3,272,506 A * 9/1966 Lescher ................. A63H 33/22 359/896
3,508,350 A * 4/1970 Genin .................. G04B 21/005 368/45
3,570,457 A * 3/1971 Curtis .................. A01K 15/021 446/419
3,600,826 A * 8/1971 Thomas ................... A61B 5/16 434/237
3,634,952 A * 1/1972 Koizumi ................ G09B 7/073 434/336
3,647,279 A * 3/1972 Sharpless .............. G02F 1/1341 D11/131
3,654,710 A * 4/1972 Barnard ................. G09B 19/00 446/485
3,689,696 A * 9/1972 Kiyoshi .................. G10L 19/02 704/267
3,724,316 A * 4/1973 Kinberg ..................... G10F 1/06 984/204
3,737,647 A * 6/1973 Gomi ....................... H03F 3/187 362/104
3,737,722 A * 6/1973 Scharlack .............. H05B 47/10 362/198
3,777,414 A * 12/1973 Robinson ............... G09B 11/10 434/103

(Continued)

*Primary Examiner* — Michael D Dennis
*Assistant Examiner* — Matthew B Stanczak
(74) *Attorney, Agent, or Firm* — AVEK IP, LLC

(57) ABSTRACT

A multifunction toy is provided in the present disclosure. A red light-emitter is arranged on a main body and capable of emitting red light. A blue light-emitter is arranged on the main body and capable of emitting blue light. A green light-emitter is arranged on the main body and capable of emitting green light. A first switch is connected to the red light-emitter and configured to control a turning on and off and a brightness of the red light-emitter. A second switch is connected to the blue light-emitter and configured to control a turning on and off and a brightness of the blue light-emitter. A third switch is connected to the green light-emitter and configured to control a turning on and off and brightness of the green light-emitter. The lampshade is opaque, allows light to pass through, and covers the red light-emitter, the blue light-emitter, and the green light-emitter.

13 Claims, 8 Drawing Sheets

(56) References Cited

U.S. PATENT DOCUMENTS

| | | | | | |
|---|---|---|---|---|---|
| 3,793,767 | A * | 2/1974 | Pulley | A01M 31/004 | 446/397 |
| 3,808,721 | A * | 5/1974 | Gersch | G09F 13/30 | 362/232 |
| 3,816,739 | A * | 6/1974 | Stolov | G09F 13/28 | 362/233 |
| 3,828,970 | A * | 8/1974 | Yamamoto | A24F 15/04 | 221/24 |
| 3,982,764 | A * | 9/1976 | Dieball | A63F 9/0468 | 273/272 |
| 4,086,710 | A * | 5/1978 | Craine | G09B 19/00 | 200/11 A |
| 4,200,867 | A * | 4/1980 | Hill | G09G 1/285 | 434/84 |
| 4,202,130 | A * | 5/1980 | Smith | A63H 33/00 | 446/26 |
| 4,228,596 | A * | 10/1980 | Daniel | A63F 3/00094 | 273/237 |
| 4,298,868 | A * | 11/1981 | Spurgeon | G09B 23/04 | 434/300 |
| 4,321,768 | A * | 3/1982 | Engehardt | A63H 33/00 | 40/550 |
| 4,333,258 | A * | 6/1982 | McCaslin | A63H 33/3055 | 446/481 |
| 4,382,795 | A * | 5/1983 | Collins | G09B 21/00 | 601/40 |
| 4,418,603 | A * | 12/1983 | Isaka | G10F 1/06 | 984/204 |
| 4,508,511 | A * | 4/1985 | McQueen | G09B 5/02 | 446/485 |
| 4,535,394 | A * | 8/1985 | Dugre | F21V 9/08 | 362/233 |
| 4,588,387 | A * | 5/1986 | Swenson | G10K 3/00 | 362/802 |
| 4,820,229 | A * | 4/1989 | Spraggins | A63H 33/00 | 446/485 |
| 4,890,528 | A * | 1/1990 | Kamijima | G10F 1/06 | 84/95.2 |
| 5,032,098 | A * | 7/1991 | Balogh | A63H 33/18 | 473/588 |
| 5,304,089 | A * | 4/1994 | Danielian | A63H 33/3088 | 446/144 |
| 5,310,377 | A * | 5/1994 | Joja | F21V 33/008 | 446/485 |
| 5,411,271 | A * | 5/1995 | Mirando | A63F 13/45 | 434/323 |
| 5,584,571 | A * | 12/1996 | Chandler | H05B 47/155 | 362/186 |
| 5,619,182 | A * | 4/1997 | Robb | A63H 33/22 | 340/815.45 |
| 5,913,683 | A * | 6/1999 | Rahmoune | G09B 5/06 | 434/104 |
| 5,949,004 | A * | 9/1999 | Orii | G10F 1/06 | 84/95.2 |
| 5,962,839 | A * | 10/1999 | Eskildsen | G09B 5/062 | 235/462.15 |
| 5,980,062 | A * | 11/1999 | Bell | G09F 9/33 | 362/184 |
| 6,139,394 | A * | 10/2000 | Maxim | A63H 3/006 | 446/485 |
| 6,241,362 | B1 * | 6/2001 | Morrison | H05B 45/20 | 362/101 |
| 6,268,554 | B1 * | 7/2001 | Ashton | G10F 1/06 | 84/95.2 |
| 6,291,749 | B1 * | 9/2001 | Tseng | A63J 17/00 | 84/95.2 |
| 6,611,244 | B1 * | 8/2003 | Guritz | H05B 47/155 | 362/103 |
| 6,882,117 | B1 * | 4/2005 | Hughes | G09F 9/33 | 315/360 |
| 6,897,622 | B2 * | 5/2005 | Lister | H05B 45/30 | 315/307 |
| 7,097,532 | B1 * | 8/2006 | Rolicki | A63H 17/28 | 446/175 |
| 7,175,298 | B2 * | 2/2007 | Schou | F21L 19/00 | 362/311.06 |
| 7,321,090 | B2 * | 1/2008 | Meng-Suen | G10F 1/06 | 84/94.1 |
| 7,397,387 | B2 * | 7/2008 | Suzuki | G09G 3/005 | 340/815.4 |
| 7,659,674 | B2 * | 2/2010 | Mueller | H05B 45/28 | 315/307 |
| 7,703,227 | B2 * | 4/2010 | Carlson | A47G 1/0622 | 40/575 |
| 7,749,044 | B1 * | 7/2010 | Herglotz | A63H 29/10 | 84/95.2 |
| 7,837,366 | B2 * | 11/2010 | King | B60Q 3/80 | 362/489 |
| 8,441,202 | B2 * | 5/2013 | Wilson | H05B 45/20 | 315/307 |
| 8,454,222 | B2 * | 6/2013 | Levon | G02B 6/0096 | 362/628 |
| 8,598,804 | B2 * | 12/2013 | Foxall | H05B 45/382 | 315/307 |
| 8,791,655 | B2 * | 7/2014 | Sadwick | H05B 47/197 | 315/117 |
| 9,390,643 | B2 * | 7/2016 | Seder | G09G 3/32 | |
| 9,396,713 | B2 * | 7/2016 | Ikeda | G10F 1/06 | |
| 9,403,101 | B2 * | 8/2016 | Thomas | A63H 33/22 | |
| 10,104,743 | B2 * | 10/2018 | Van Liempd | H05B 45/20 | |
| 10,302,290 | B2 * | 5/2019 | Sutton | F21V 33/008 | |
| 11,207,610 | B2 * | 12/2021 | Rosen | A63H 33/22 | |
| 12,183,724 | B2 * | 12/2024 | Lin | H10W 70/614 | |
| 2003/0137258 | A1 * | 7/2003 | Piepgras | H05B 45/20 | 315/312 |
| 2004/0067713 | A1 * | 4/2004 | Fong | A63H 3/006 | 446/175 |
| 2004/0067714 | A1 * | 4/2004 | Fong | A63H 3/006 | 446/175 |
| 2004/0077264 | A1 * | 4/2004 | Walker | A63H 33/26 | 446/175 |
| 2004/0141321 | A1 * | 7/2004 | Dowling | A63H 33/22 | 362/276 |
| 2005/0285547 | A1 * | 12/2005 | Piepgras | F21V 23/0442 | 315/294 |
| 2006/0046606 | A1 * | 3/2006 | Martin | A63H 30/00 | 446/166 |
| 2007/0041174 | A1 * | 2/2007 | Lo | G02B 6/001 | 362/102 |
| 2007/0223220 | A1 * | 9/2007 | Flagle | H05B 47/155 | 362/232 |
| 2009/0191787 | A1 * | 7/2009 | Rubinstein | A63H 27/10 | 446/220 |
| 2010/0008083 | A1 * | 1/2010 | Johnson | F21L 4/027 | 362/208 |
| 2011/0070805 | A1 * | 3/2011 | Islava | A63H 3/28 | 446/397 |
| 2011/0088292 | A1 * | 4/2011 | Kay | B42D 15/022 | 40/442 |
| 2012/0200828 | A1 * | 8/2012 | Chien | G03B 21/28 | 353/1 |
| 2015/0105167 | A1 * | 4/2015 | Kim | A63H 33/22 | 472/57 |
| 2015/0196853 | A1 * | 7/2015 | Thomas | A63H 5/00 | 446/485 |
| 2017/0209803 | A1 * | 7/2017 | Tebbe | A63H 33/22 | |
| 2019/0094646 | A1 * | 3/2019 | Paolini, Jr. | E04F 13/18 | |
| 2019/0120477 | A1 * | 4/2019 | Yan | H05B 45/24 | |
| 2020/0400303 | A1 * | 12/2020 | Diamonds | F21V 33/008 | |
| 2021/0185780 | A1 * | 6/2021 | Lula | H05B 45/325 | |
| 2021/0219404 | A1 * | 7/2021 | Ruskykh | H05B 45/12 | |
| 2021/0225341 | A1 * | 7/2021 | Tougher | G10H 1/0083 | |
| 2022/0283655 | A1 * | 9/2022 | Wells | G09B 5/06 | |
| 2023/0037021 | A1 * | 2/2023 | Hoang | A63H 33/18 | |
| 2023/0101374 | A1 * | 3/2023 | Kosecoff | G06V 40/171 | 434/100 |

(56) References Cited

U.S. PATENT DOCUMENTS

| | | | | |
|---|---|---|---|---|
| 2023/0204188 | A1* | 6/2023 | Colquhoun | A63H 3/006 362/175 |
| 2024/0255121 | A1* | 8/2024 | Johnson | F21V 3/02 |
| 2025/0035832 | A1* | 1/2025 | Shen | G02B 6/0031 |

* cited by examiner

MULTIFUNCTION TOY

FIELD

The present disclosure relates to the field of children's toys, and particularly to a multifunction toy.

BACKGROUND

In order to cultivate children's logical thinking and promote their brain development, people generally install switches, light-emitters, buttons, plugs, etc. on a wooden board to create a busy board toy for children to explore and play freely. However, in the busy boards in related arts, there is often a one-to-one or one-to-many control relationship between switches and light-emitters. For example, when a switch is closed, a corresponding light-emitter lights up, and the results after each switch is closed are not related to one another. The playing methods of these busy boards are too simple and lack enjoyment.

SUMMARY

A multifunction toy is provided in the present disclosure. The multifunction toy includes a main body, a red light-emitter, a blue light-emitter, a green light-emitter, a first switch, a second switch, a third switch, and a lampshade. The red light-emitter is arranged on the main body and capable of emitting red light. The blue light-emitter is arranged on the main body and capable of emitting blue light. The green light-emitter is arranged on the main body and capable of emitting green light. The first switch is electrically connected to the red light-emitter and configured to control a turning on and off and a brightness of the red light-emitter. The second switch is electrically connected to the blue light-emitter and configured to control a turning on and off and a brightness of the blue light-emitter. The third switch is electrically connected to the green light-emitter and configured to control a turning on and off and brightness of the green light-emitter. The lampshade is opaque and allows light to pass through. The lampshade is mounted on the main body and covers the red light-emitter, the blue light-emitter, and the green light-emitter.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
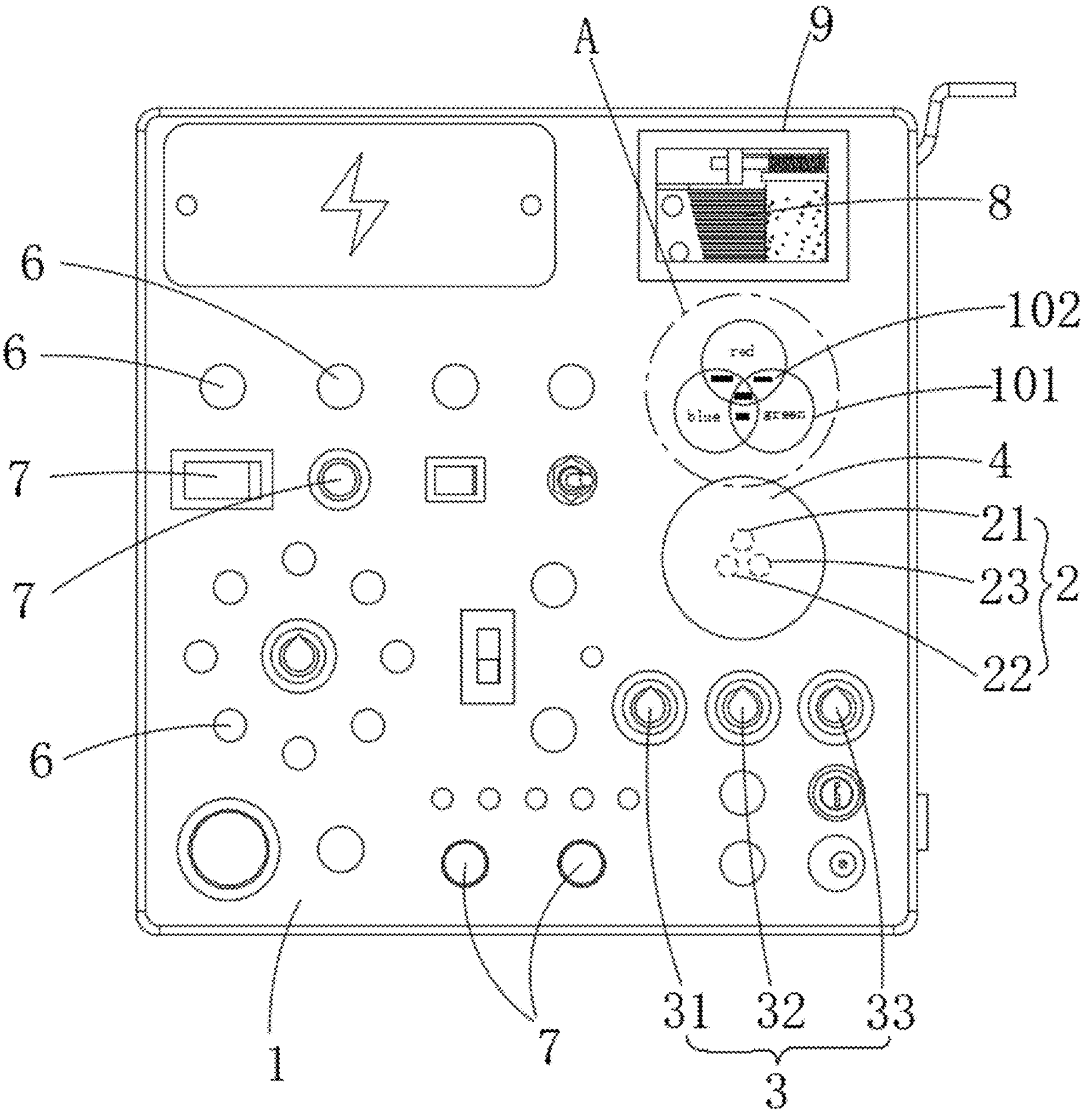
FIG. 1 is a schematic view I of an overall structure of a multifunction toy according to an embodiment of the present disclosure.

- main body 1, front shell 11, rear cover 12, monochromatic identification 101, mixed-color identification 102, mounting cavity 103, light-transmitting hole 104, identification pattern 105, observation window 106, first mounting hole 107, second mounting hole 108, third mounting hole 109, battery compartment 111, opening 1031, red identification 1011, blue identification 1012, green identification 1013;
- first function light-emitter 2, red light-emitter 21, blue light-emitter 22, green light-emitter 23;
- first function switch 3, first switch 31, second switch 32, third switch 33;
- lampshade 4;
- circuit board 5;
- second function light-emitter 6;
- second function switch 7;
- sound-producing device 8, fixing element 81, rotating drum 82, sound-producing element 83, driving rod 84, driving boss 821, tuning fork 831;
- transparent cover 9.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-8, a multifunction toy, in particular to a busy board is provided in the present disclosure. The busy board includes a main body 1, a plurality of first function light-emitters 2, a plurality of first function switches 3, and a lampshade 4. Particularly, the main body 1 is made of a wood material. Each of the plurality of first function light-emitters 2 is arranged on the main body 1, and each of the plurality of first function light-emitters 2 is capable of emitting a monochromatic light with a color different from that of a monochromatic light emitted by other first function light emitters 2. Each first function light-emitter 2 is a lamp bead. Each first function switch 3 is correspondingly configured to control a turning on and off and a brightness of at least one first function light-emitter 2. The lampshade 4 is opaque but allows light to pass through. The lampshade 4 is mounted on the main body 1 and covers the plurality of first function light-emitters 2.

When in use, after any one first function switch 3 is closed, at least one corresponding first function light-emitter 2 emits a monochromatic light. This monochromatic light irradiates onto the lampshade 4 that is opaque but allows light to pass through, and the lampshade 4 presents a same color as this monochromatic light. When several first function switches 3 are closed simultaneously, there are several first function light-emitters 2 each of which emits a monochromatic light with a color different from that of a monochromatic light emitted by other first function light-emitters 3. The several monochromatic lights jointly irradiate onto the lampshade 4 that is opaque but allows light to pass through, thus the lampshade 4 can exhibit a mixed color of the several monochromatic lights. It should be noted that, the opaque design of the lampshade 4 is mainly for mixing the lights of various colors firstly and then allowing them to pass through the lampshade 4 to irradiate onto retina of the human eye, rather than directly irradiating onto the retina of the human eye, so as to prevent a certain monochromatic light from being too strong to achieve the color-mixing effect and avoid overly harsh light.

In the present embodiment, based on the three primary colors, the plurality of first function light-emitters 2 include a red light-emitter 21, a blue light-emitter 22, and a green light-emitter 23. The plurality of first function switches 3 include a first switch 31, a second switch 32, and a third switch 33. The first switch 31 correspondingly controls the red light-emitter 21, the second switch 32 correspondingly controls the blue light-emitter 22, and the third switch 33 correspondingly controls the green light-emitter 23.

In other words, the first switch 31 is electrically connected to the red light-emitter 21 and controls a turning on and off and a brightness of the red light-emitter 21. The second switch 32 is electrically connected to the blue light-emitter 22 and controls a turning on and off and a brightness of the blue light-emitter 22. The third switch 33 is electrically connected to the green light-emitter 23 and controls a turning on and off and a brightness of the green light-emitter 23.

In the present embodiment, the lampshade 4 is made of a white and opaque material that allows light to pass through. When the red light-emitter 21 and the blue light-emitter 22 simultaneously light up in the lampshade 4, the lampshade 4 exhibits magenta. When the red light-emitter 21 and the green light-emitter 23 simultaneously light up in the lampshade 4, the lampshade 4 exhibits yellow. When the blue light-emitter 22 and the green light-emitter 23 simultaneously light up in the lampshade 4, the lampshade 4 exhibits cyan. Therefore, for the busy board in the present embodiment, the results of the plurality of first function switches 3 are associated with each other, thereby improving the playability of the busy board, helping children to recognize light colors, and promoting the cultivation of children's logical thinking.

In other embodiments, the lampshade 4 can also be made of a red and opaque material that allows light to pass through. When lamp beads emitting blue light and lamp beads emitting green light simultaneously light up in the lampshade 4, the lampshade 4 exhibits white. Of course, the lampshade 4 can also be made of a transparent material that allows light to pass through, and a white opaque film is sprayed or attached on the lampshade 4, in this way, the aforementioned effect can also be achieved.

Figure 3:
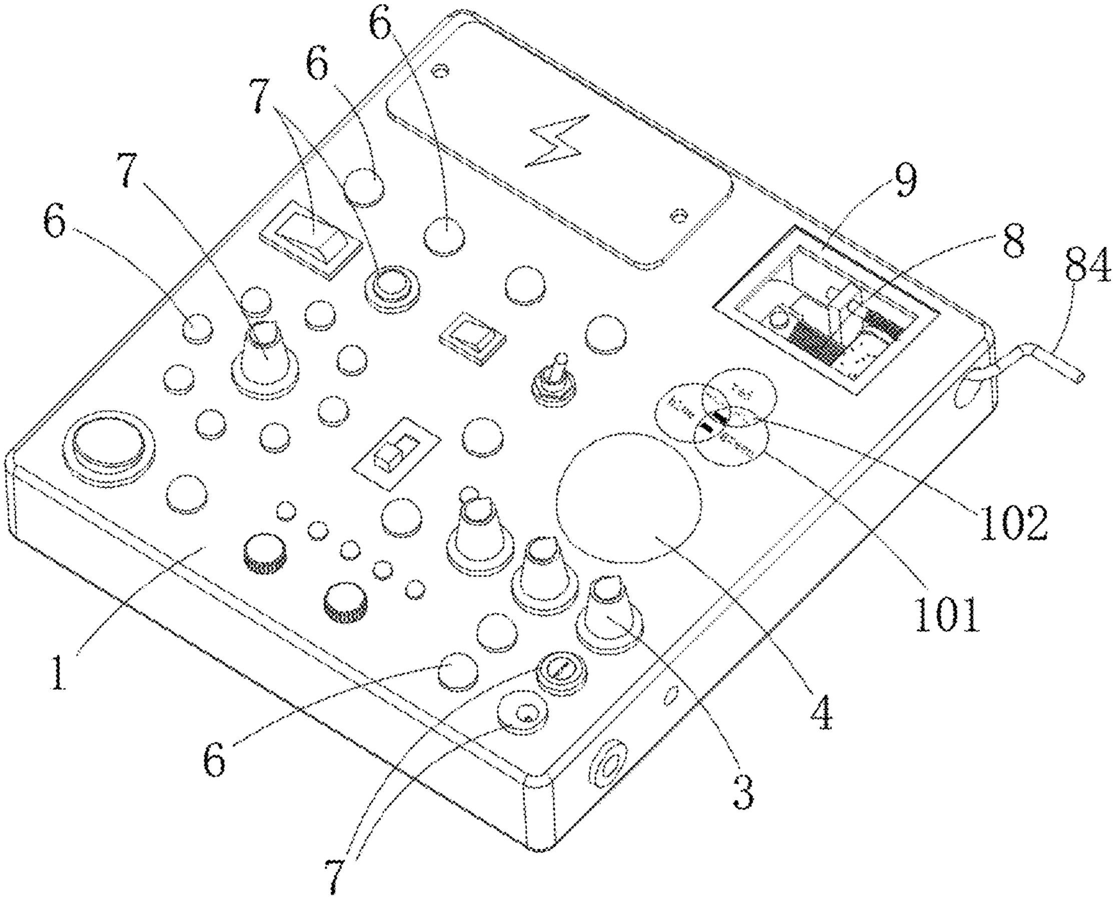
FIG. 3 is a schematic view II of the overall structure of the multifunction toy according to an embodiment of the present disclosure.
Figure 4:
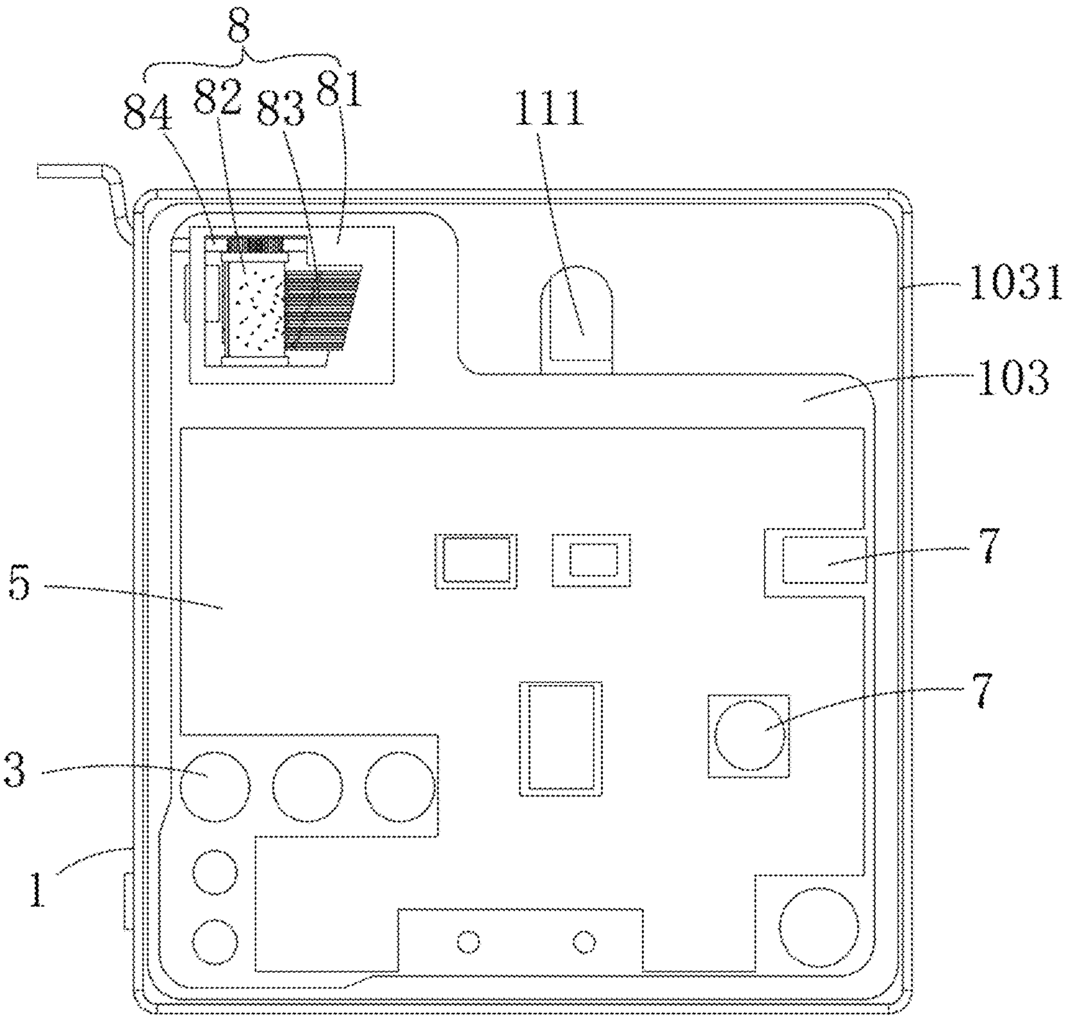
FIG. 4 is a schematic view of an internal structure of a main body according to an embodiment of the present disclosure.

Furthermore, the lampshade 4 may be in a shape of a sheet, a square, a sphere, a spherical segment etc. Particularly, the lampshade 4 is in a shape of a hemisphere to extend an illumination range of the light source, as shown in FIGS. 1 and 3.

Figure 2:
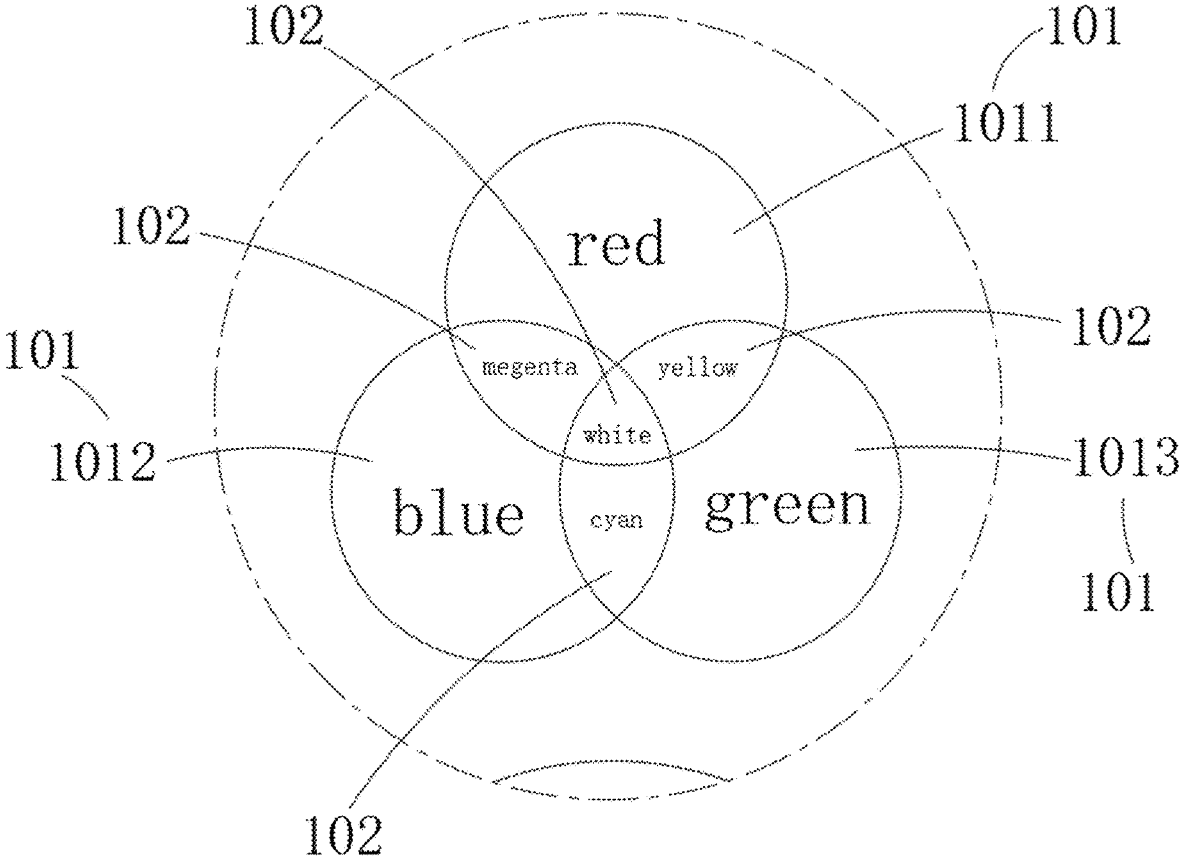
FIG. 2 is an enlarged view of a portion A in FIG. 1.

Further, as shown in FIG. 2, the main body 1 is arranged with monochromatic identifications 101 corresponding to the colors of the plurality of first function light-emitters 2. For example, the main body 1 is arranged with a red identification 1011 corresponding to the red light-emitter 21, a blue identification 1012 corresponding to the blue light-emitter 22, and a green identification 1013 corresponding to the green light-emitter 23. The red identification 1011, the blue identification 1012, and the green identification 1013 overlap with each other, and a mixed-color identification 102 is arranged in a corresponding overlapping area of the red identification 1011, the blue identification 1012, and the green identification 1013. In this embodiment, each of the red identification 1011, the blue identification 1012, and the green identification 1013 is circular. A magenta identification is arranged in an overlapping area of the red identification 1011 and the blue identification 1012, a yellow identification is arranged in an overlapping area of the red identification 1011 and the green identification 1013, a cyan identification is arranged in an overlapping area of the blue identification 1012 and the green identification 1013, and a white identification is arranged in an overlapping area of all of the red identification 1011, the blue identification 1012, and the green identification 1013. All of the magenta identification, the yellow identification, the cyan identification, and the white identification belong to the aforementioned mixed-color identifications 102. The above-mentioned design is mainly to facilitate children to recognize what color will be exhibit when each first function switch 3 is closed, so as to help build children's logical thinking.

Furthermore, in order to facilitate the user to control the turning on and off of a first function light-emitter 2 of a corresponding color, in this embodiment, each of the plurality of first function switches 3 has a color in accordance with a corresponding first function light-emitter 2. For example, the first switch 31 has a red color in accordance with the red light-emitter 21, the second switch 32 has a blue color in accordance with the blue light-emitter 22, and the third switch 33 has a green color in accordance with the green light-emitter 23, so that the user is aware what color of light may be emitted in the lampshade 4 when each first function switch 3 is closed. In addition, the first function switch 3 is a rotary switch in a shape of a column, which is mainly convenient for controlling a color depth of a corresponding first function light-emitter 2. For example, the first switch 31 can control the light-emitter 21 to emit light pink, bright red, or deep red light. Therefore, the colors presented by the lampshade 4 are not fixed, but diverse.

Specifically, in the present embodiment, the main body 1 defines a mounting cavity 103 and opens a light-transmitting hole 104. The plurality of first function light-emitters 2 are located in the light-transmitting hole 104. The lampshade 4 is mounted on an outside of the main body 1 and covers the light-transmitting hole 104. Specifically, the lampshade 4 is mounted on the main body 1 by gluing. The busy board further includes a circuit board 5. The circuit board 5 is mounted in the mounting cavity 103 by gluing or screwing, etc. Each of the plurality of first function light-emitters 2 and the plurality of first function switches 3 is electrically connected to the circuit board 5. In addition, the main body 1 further opens a plurality of first mounting holes 107 corresponding to the plurality of first function switches 3. Each first function switch 3 is mounted in a corresponding first mounting hole 107 by gluing.

Figure 5:
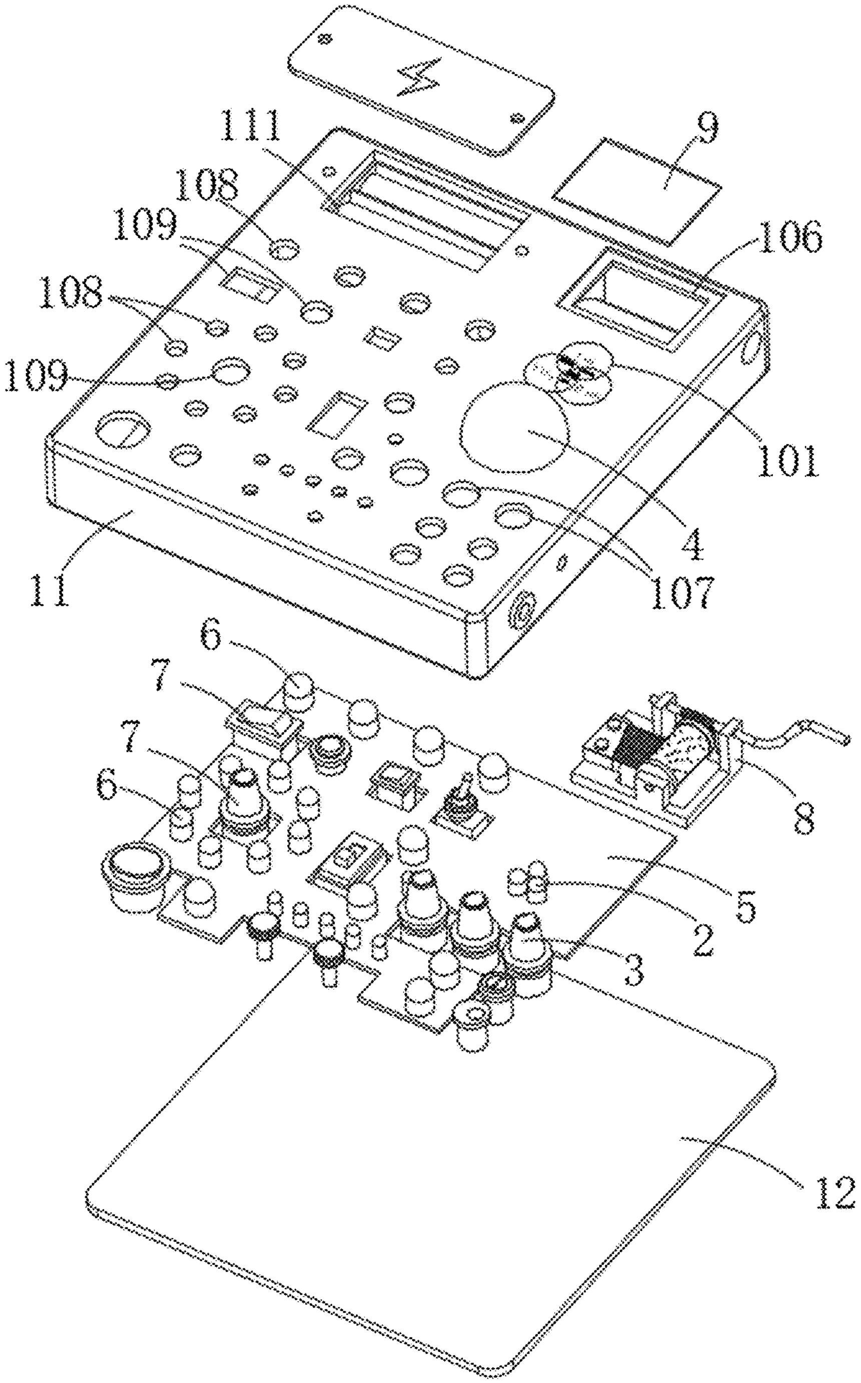
FIG. 5 is an exploded view of the multifunction toy according to an embodiment of the present disclosure.
Figure 6:
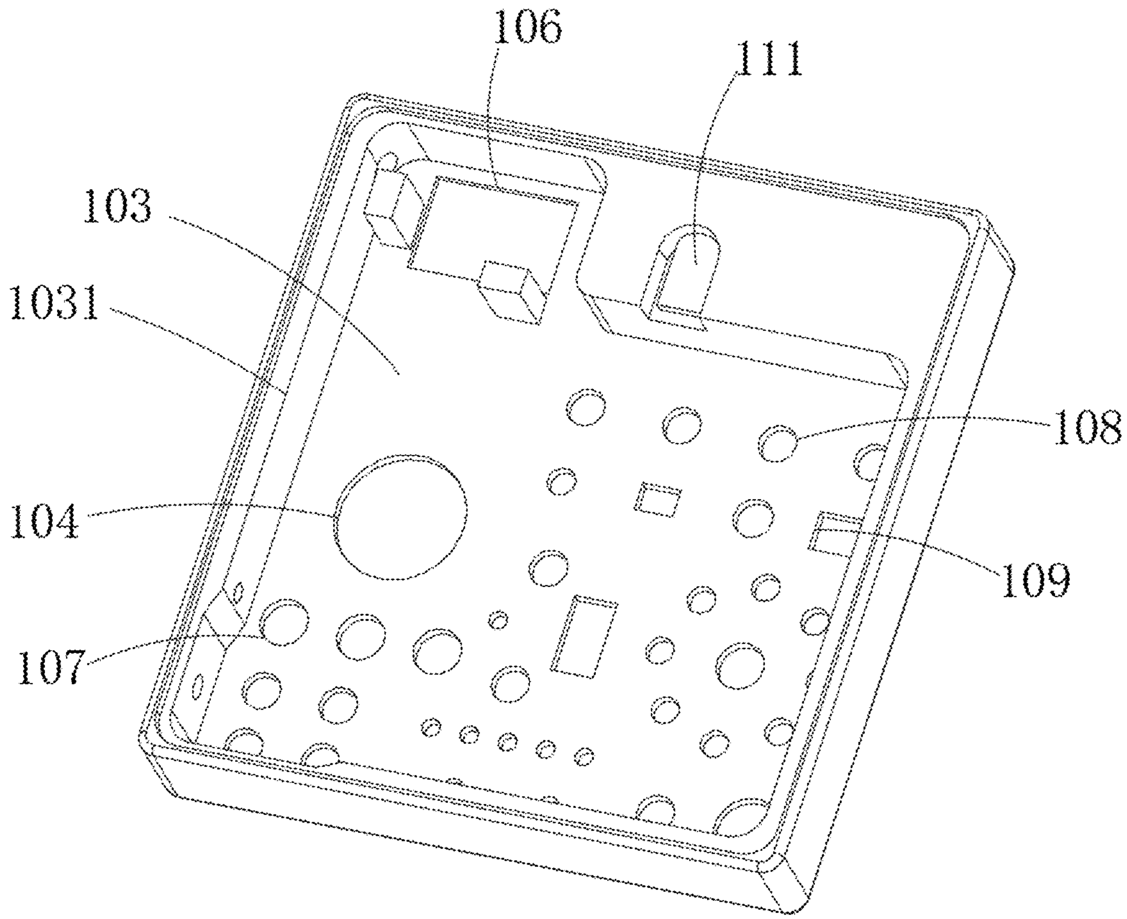
FIG. 6 is a structural view of a front shell according to an embodiment of the present disclosure.

Referring to FIGS. 1, 3, and 5, in order to enhance interestingness of the busy board, in the present embodiment, the busy board further includes a plurality of second function light-emitters 6 and a plurality of second function switches 7. Each of the plurality of second function light-emitters 6 and the plurality of second function switches 7 is electrically connected to the circuit board 5. The plurality of second function switches 7 are configured to correspondingly control the plurality of second function light-emitters 6. The plurality of second function light-emitters 6 are exposed from an outer wall of the main body 1. The plurality of second function light-emitters 6 are also lamp beads. A difference between the second function light-emitters 6 and the first function light-emitters 2 lies in: the second function light-emitters 6 are not covered by the lampshade 4. The second function light-emitters 6 only present results directly corresponding to the second function switches 7 being closed.

Furthermore, the main body 1 opens a plurality of second mounting holes 108 corresponding to the plurality of second function light-emitters 6, and a plurality of third mounting holes 109 corresponding to the plurality of second function switches 7. In other words, all of the first function switches 3, the second function light-emitters 6, and the second function switches 7 are exposed from the outer wall of the main body 1, thus facilitating the user to observe an on-off of each light-emitter and manipulate each switch. In addition, each of the first function switches 3 and the second function switches 7 may be a rocker switch, a toggle switch, a slide switch, a push-button switch, a touch switch, etc., and can also be a lock, an interface, etc.

In this embodiment, referring to FIG. 5, the main body 1 includes a front shell 11 and a rear cover 12. Each of the front shell 11 and the rear cover 12 is made of the wood material. The mounting cavity 103 is defined in the front shell 11. A back of the front shell 11 defines an opening 1031 communicated with the mounting cavity 103. The rear cover 12 is mounted on the front shell 11 by gluing or screwing and covers the opening 1031. All of the aforementioned first mounting holes 107, second mounting holes 108, and third mounting holes 109 are opened in the front shell 11. The circuit board 5 is also connected to an inside of the front shell 11 by gluing, so that the circuit board is attached to the front shell 11.

In addition, a battery compartment 111 is also mounted on the front shell 11 for accommodating a dry battery. The battery compartment 111 is electrically connected to the circuit board 5 to provide energy for the first functional light-emitters 2 and the second functional light-emitters 6.

Figure 8:
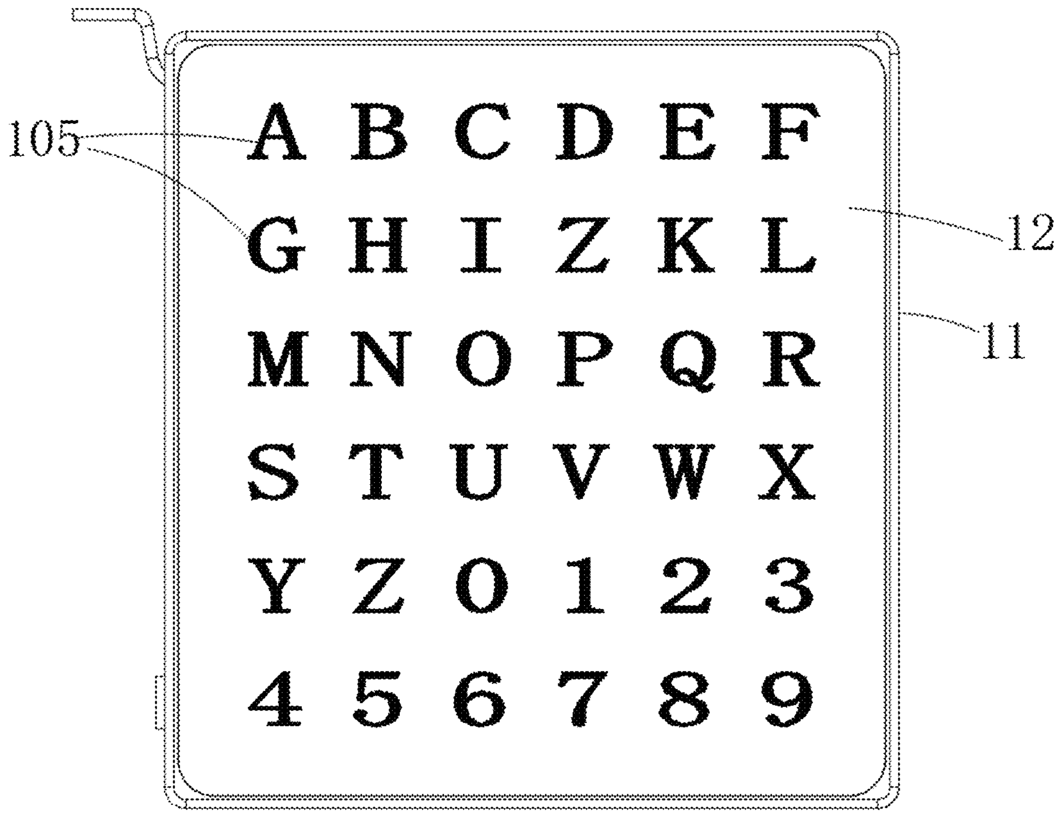
FIG. 8 is a schematic view of identification patterns on a rear cover according to an embodiment of the present disclosure.

Furthermore, the rear cover 12 has a plurality of identification patterns 105, increasing a usable area of the busy board. As shown in FIG. 8, the identification patterns 105 are English letters and Arabic numerals. In this way, a back of the busy board can be used as a literacy board.

To provide users with a multi-sensory experience, the busy board further includes a sound-producing device 8. The sound-producing device 8 is mounted on the main body 1. After the light-emitting device is activated, a preset music can be played by the sound-producing device 8.

Figure 7:
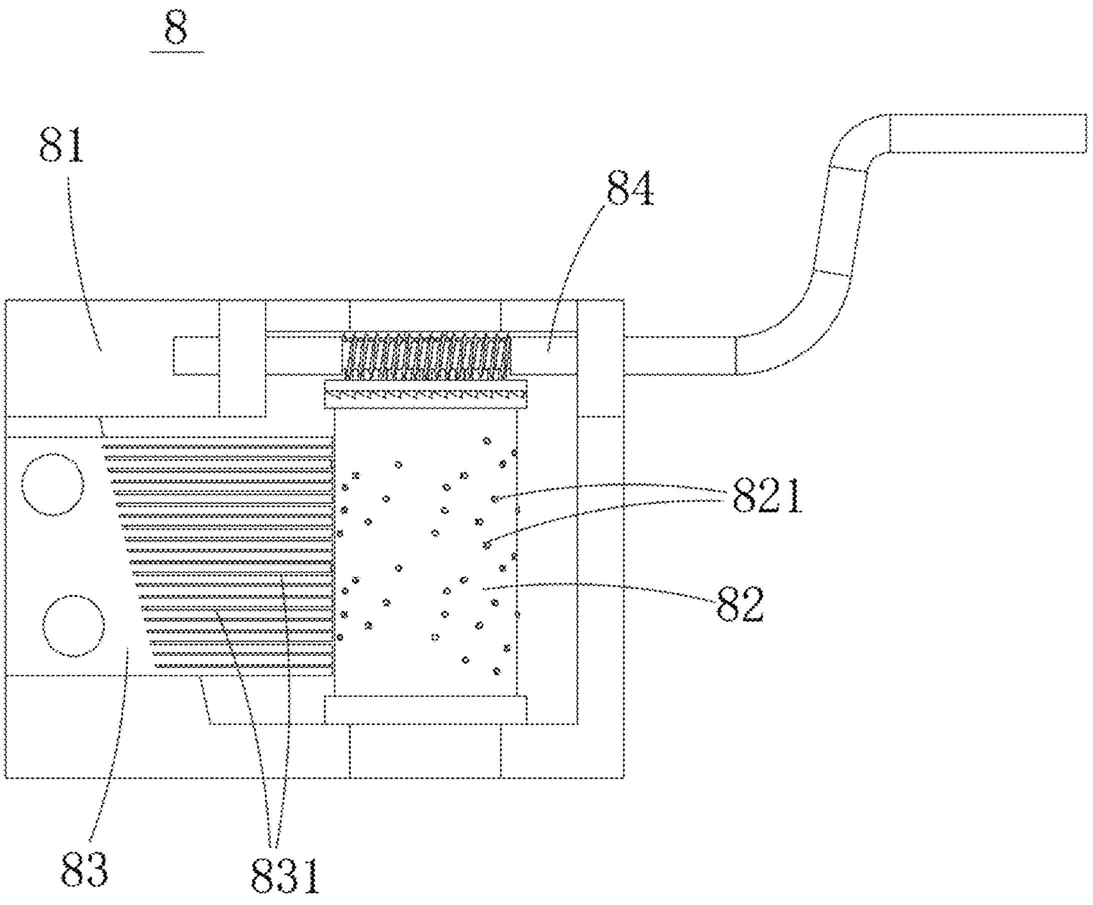
FIG. 7 is a structural view of a sound-producing device according to an embodiment of the present disclosure.

Specifically, as shown in FIG. 7, the sound-producing device 8 includes a fixing element 81, a rotating drum 82, a sound-producing element 83, and a driving rod 84. The fixing element 81 is mounted in a cavity. The rotating drum 82 is rotatably arranged on the fixing element 81. A plurality of driving bosses 821 are arranged on a periphery of the rotating drum 82. The plurality of driving bosses 821 are also distributed along an axial direction of the rotating drum 82. The sound-producing element 83 is fixedly mounted on the fixing element 81. The sound-producing element 83 is arranged with a plurality of tuning forks 831. The plurality of driving bosses 821 can correspondingly pluck the plurality of tuning forks 831, enable the tuning forks 831 to vibrate and produce sound. Therefore, positions of the plurality of driving bosses 821 can be designed to enable the plurality of tuning forks 831 to be regularly plucked. In this way, a preset music can be produced only by rotating the rotating drum 82. The driving rod 84 is rotatably mounted on the fixing element 81. The driving rod 84 is in a driving connection with the rotating drum 82 and is capable of driving the rotating drum 82 to rotate. The driving rod 84 penetrates the main body 1 and extends to an outside of the main body 1. The user can rotate the driving rod 84 to drive the rotating drum 82 to rotate. In addition, the rotating drum 82 can be further arranged with a ratchet rotation structure to prevent the rotating drum 82 from rotating in reverse.

Additionally, in order to satisfy children's curiosity, in the present embodiment, the main body 1 defines an observation window 106 at a position corresponding to the sound-producing element 83. The busy board further includes a transparent cover 9. The transparent cover 9 is connected to the main body 1 at the observation window 106. In this way, children can observe the vibration of the tuning forks 831 inside the main body 1 from the observation window 106.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A multifunction toy, comprising:

a main body;

a red light-emitter, arranged on the main body and capable of emitting red light;

a blue light-emitter, arranged on the main body and capable of emitting blue light;

a green light-emitter, arranged on the main body and capable of emitting green light;

a first switch, electrically connected to the red light-emitter and configured to control a turning on and off and a brightness of the red light-emitter;

a second switch, electrically connected to the blue light-emitter and configured to control a turning on and off and a brightness of the blue light-emitter;

a third switch, electrically connected to the green light-emitter and configured to control a turning on and off and a brightness of the green light-emitter; and a lampshade, wherein the lampshade is mounted on the main body and covers the red light-emitter, the blue light-emitter, and the green light-emitter; light emitted from the red light-emitter, light emitted from the blue light-emitter, and light emitted from the green light-emitter are capable of being mixed with each other inside the lampshade to generate a mixed light, and the mixed light is configured to be emitted to an outside of the multifunction toy;

wherein:

each of the first switch, the second switch, and the third switch is at least partially exposed out of an outer surface of the main body; each of the first switch, the second switch, and the third switch is exposed to and is manually manipulatable by a user; at least two of the first switch, the second switch, and the third switch are capable of being turned on at the same time;

the main body is arranged with a red mark corresponding to the red light-emitter, a blue mark corresponding to the blue light-emitter, and a green mark corresponding to the green light-emitter; the red mark, the blue mark, and the green mark overlap with each other, and a mixed-color mark is arranged in a corresponding overlapping area of the red mark, the blue mark, and the green mark;

the multifunction toy further comprises a plurality of second function light-emitters and a plurality of second function switches independent from the first switch, the second switch, and the third switch; the plurality of second function light-emitters are correspondingly electrically connected to the plurality of second function switches, the plurality of second function switches are correspondingly configured to control the plurality of second function light-emitters to be turned on or turned off; and the plurality of second function light-emitters are exposed out of the outer surface of the main body and are exposed out of the lampshade; and the plurality of second function light-emitters are configured to emit light directly, without being mixed with any light from any light-emitter, to the outside of the multifunction toy.

2. The multifunction toy as claimed in claim 1, wherein the lampshade is made of a white material that allows light to pass through.

3. The multifunction toy as claimed in claim 1, wherein the lampshade is in a shape of a sphere or a spherical segment.

4. The multifunction toy as claimed in claim 1, wherein the first switch has a red color corresponding to the red light-emitter, the second switch has a blue color corresponding to the blue light-emitter, and the third switch has a green color corresponding to the green light-emitter.

5. The multifunction toy as claimed in claim 1, wherein each of the first switch, the second switch, and the third switch is a rotary switch in a shape of a column.

6. The multifunction toy as claimed in claim 1, wherein the main body defines a mounting cavity and opens a light-transmitting hole, each of the red light-emitter, the blue light-emitter, and the green light-emitter is located at the light-transmitting hole, and the lampshade covers the light-transmitting hole.

7. The multifunction toy as claimed in claim 6, wherein the multifunction toy further comprises a circuit board, the circuit board is mounted in the mounting cavity, and each of the red light-emitter, the blue light-emitter, the green light-emitter, the first switch, the second switch, and the third switch is electrically connected to the circuit board.

8. The multifunction toy as claimed in claim 7, wherein the main body comprises a front shell and a rear cover, the front shell and the rear cover enclose to form the mounting cavity, the circuit board is fixedly connected to the front shell, and each of the red light-emitter, the blue light-emitter, the green light-emitter, the first switch, the second switch, and the third switch is disposed on the front shell.

9. The multifunction toy as claimed in claim 8, wherein each of the front shell and the rear cover is made of a wood material.

10. The multifunction toy as claimed in claim 8, wherein the circuit board is attached to the front shell and fixed to the front shell by gluing.

11. The multifunction toy as claimed in claim 1, further comprising a sound-producing device, wherein the sound-producing device comprises:

a fixing element, mounted on the main body;

a rotating drum, rotatably arranged on the fixing element, wherein a plurality of driving bosses are arranged on a periphery of the rotating drum;

a sound-producing element, fixedly mounted on the fixing element and arranged with a plurality of tuning forks, wherein the plurality of driving bosses are capable of correspondingly driving the plurality of tuning forks; and a driving rod, rotatably mounted on the fixing element, wherein the driving rod is in a driving connection with the rotating drum and configured to drive the rotating drum to rotate.

12. The multifunction toy as claimed in claim 11, wherein the main body defines a mounting cavity, the fixing element is located in the mounted cavity, and the driving rod penetrates the main body and extends to an outside of the main body.

13. The multifunction toy as claimed in claim 12, wherein:

the main body opens an observation window at a position corresponding to the sound-producing element; and the multifunction toy further comprises a transparent cover, and the transparent cover is connected to the main body at the observation window.

* * * * *